C. BRUNKHURST.
MULTIPLE SPOON MEASURE.
APPLICATION FILED MAY 15, 1917.
1,249,017.
Patented Dec. 4, 1917.
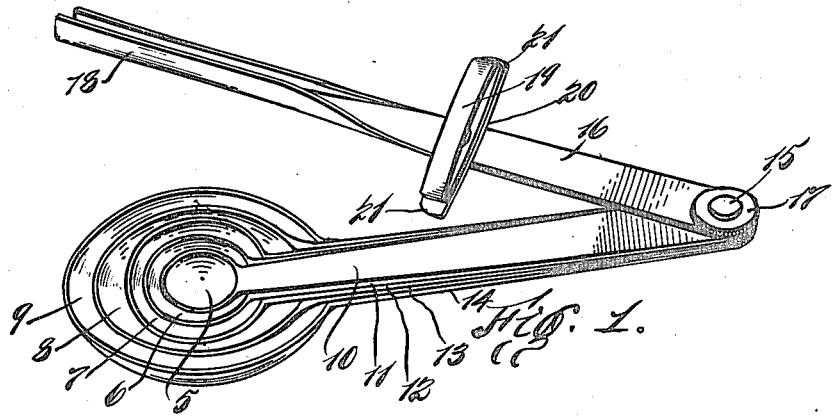
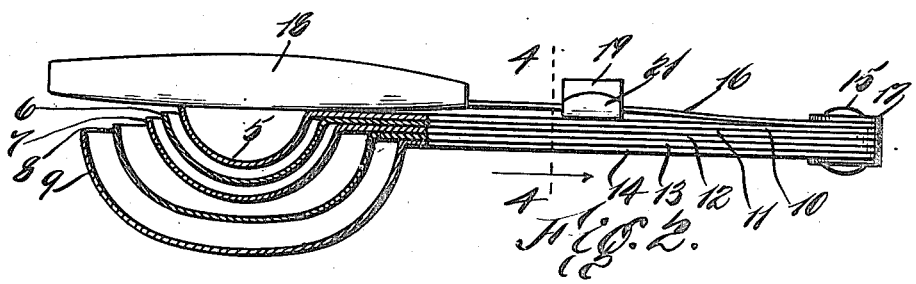
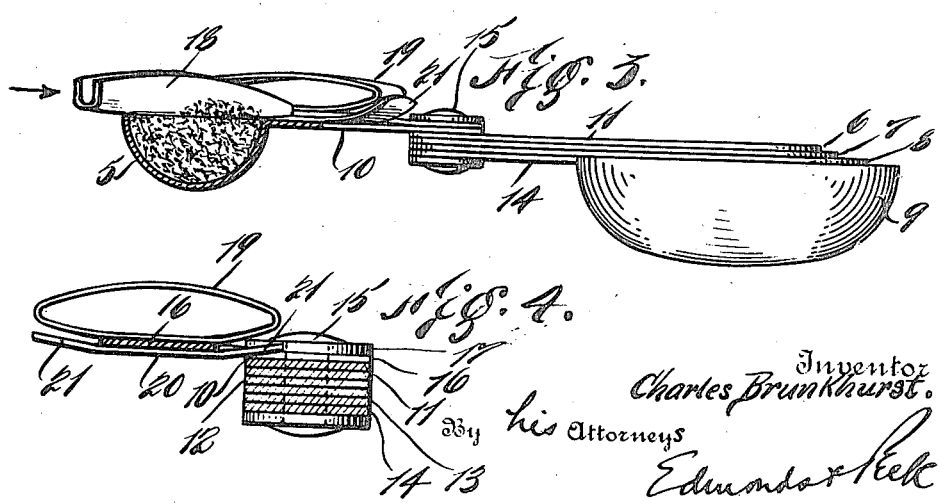
Inventor
Charles Brunkhurst.
By his Attorneys
Edmund Peek

UNITED STATES PATENT OFFICE.

CHARLES BRUNKHURST, OF MIDDLETOWN, NEW YORK.

MULTIPLE-SPOON MEASURE.

1,249,017. Specification of Letters Patent. Patented Dec. 4, 1917.

Application filed May 15, 1917. Serial No. 168,759.

*To all whom it may concern:*

Be it known that I, CHARLES BRUNKHURST, a citizen of the United States, and a resident of Middletown, in the county of Orange and State of New York, have invented certain new and useful Improvements in Multiple-Spoon Measures, of which the following is a specification, reference being had to the accompanying drawings, forming a part thereof.

My invention relates to measuring devices for use in households, laboratories, or other places, the object being to provide a multiple spoon measure in which a plurality of spoon receptacles of different capacities are combined together with a swinging leveling scraper member, adapted to rotate across the plane of the edges of each of the separate receptacles so as to level off the contents of the separate spoon receptacles, as required, with great ease and accuracy, my invention providing a simple and efficient utensil for measuring in different quantities, in a single device, powdered or granular substances for use in connection particularly with culinary operations.

The invention comprises a plurality of spoon measures, each of a specified capacity, as for example, one-quarter teaspoonful, one-half teaspoonful, one teaspoonful, one dessert spoonful, and one tablespoonful, all of which spoon measures are provided with separate handles connected together by a common pivot, and I have joined therewith a swinging scraper mounted above the separate spoons, which are adapted to be nested, the dessert spoon within the tablespoon, the teaspoon within the dessert spoon, etc., the small one-quarter teaspoon being on top. The leveling scraper is more or less loosely mounted on the common pivot of the spoons, and preferably has a slight resiliency so as to be able to adapt itself in its rotatory leveling movements so as to coact with any of the spoon measures which it is desired to use.

In the accompanying drawings, Figure 1 is a perspective view of my multiple spoon measure; Fig. 2 is a side view, partly in section, the scraper member being shown as coacting with the smallest spoon; Fig. 3 is an end view, the spoons being separated, one being shown in section while the scraper is shown as leveling the contents of the separated spoon, and Fig. 4 is a cross-sectional view on the line 4—4 of Fig. 2 looking in the direction of the arrow.

Similar numerals refer to similar parts throughout the several figures.

Referring to the drawings, 5, 6, 7, 8 and 9 indicate five separate spoon measures, as hereinbefore described, having respectively the handles 10, 11, 12, 13 and 14. The length of the handles of the separate spoons is proportioned so that the separate receptacles are adapted to telescope within one another as shown in Figs. 1 and 2, and yet be joined together with a common swivel or pivot connection 15. Mounted on the pivot 15 is the leveling scraper member 16, which is loosely held on the pivot by the washer 17. The outer end 18 of the scraper 16 is bent upwardly in U-shape in cross-section, as shown in Figs. 1 and 3, and midway between the U-shaped end and the pivot 15 I have secured to the scraper a loop handle 19 having the guide 20 secured on the under side of the scraper 16, with its ends 21 slightly bent upwardly so that the scraper 16 as it is rotated on its pivot 15 may readily ride over any one of the handles of the separate spoons in order that the outer end may coact with the spoon edges of the particular receptacle, as shown in Figs. 3 and 4, the contents of which are being leveled off preparatory for use.

In Fig. 3 I have illustrated the top spoon 5 having its contents leveled off by the U-shaped outer end of the scraper 16 while the remaining spoon measures are retained in their telescoped position out of use.

One of the features of my invention is that the leveling scraper is not only resilient, but also is loosely pivoted to the common pivot 15, so that its operative end 18 may coact not only with the small spoon 5, but also may coact with the edges of the largest spoon 9 when the spoons 5, 6, 7 and 8 are lifted out of the bowl portion of the spoon 9 and are swung away so that the under surface of the end 18 may readily coact with the edges of the spoon 9; in other words, by making the handle 16 of resilient material, and having it loosely pivoted on the common pivot 15, the under surface of the operative end 18 of the scraper may be rotatively swung on such pivot in different vertical planes so as to coact with the edges of any one of the five spoons of different capacities so joined together with the common pivot, as shown in Figs. 2 and 3.

Having now described my invention, what I claim as new and desire to secure by Letters Patent is the following, viz:

1. A multiple-spoon measure comprising a plurality of receptacles pivotally connected together, combined with an independently rotatable leveling scraper member coacting with any of said receptacles along its edges.

2. A multiple-spoon measure comprising a plurality of receptacles of different capacities pivotally connected together, combined with an independently rotatable leveling scraper member coacting with any of said receptacles along its edges.

3. A multiple-spoon measure comprising a plurality of receptacles of different capacities pivotally connected together and adapted to be nested when not in use, combined with a scraper member rotatably secured to said pivotal connection and coacting with any of said receptacles along its edges.

4. A multiple-spoon measure comprising a plurality of receptacles of different capacities pivotally connected together and adapted to be nested when not in use, combined with a scraper member rotatably and loosely secured to said pivotal connection and coacting with any of said receptacles along its edges.

5. A multiple-spoon measure comprising a plurality of receptacles of different capacities, each having a projecting handle, said handles having a common pivotal connection permitting relative movement each to the other, combined with a leveling scraper member rotatably secured to said pivotal connection above said handles whereby its under surface may coact with the upper edges of any of said receptacles when rotated.

6. A multiple-spoon measure comprising a plurality of receptacles of different capacities, each having a projecting handle, said handles having a common pivotal connection permitting relative movement each to the other, combined with a leveling scraper member rotatably and loosely secured to said pivotal connection above said handles whereby its under surface may coact with the upper edges of any of said receptacles when rotated.

CHARLES BRUNKHURST.

Witnesses:
WINFIELD S. BRUNKHURST,
MARK A. HOPKINS.